Figure 1:
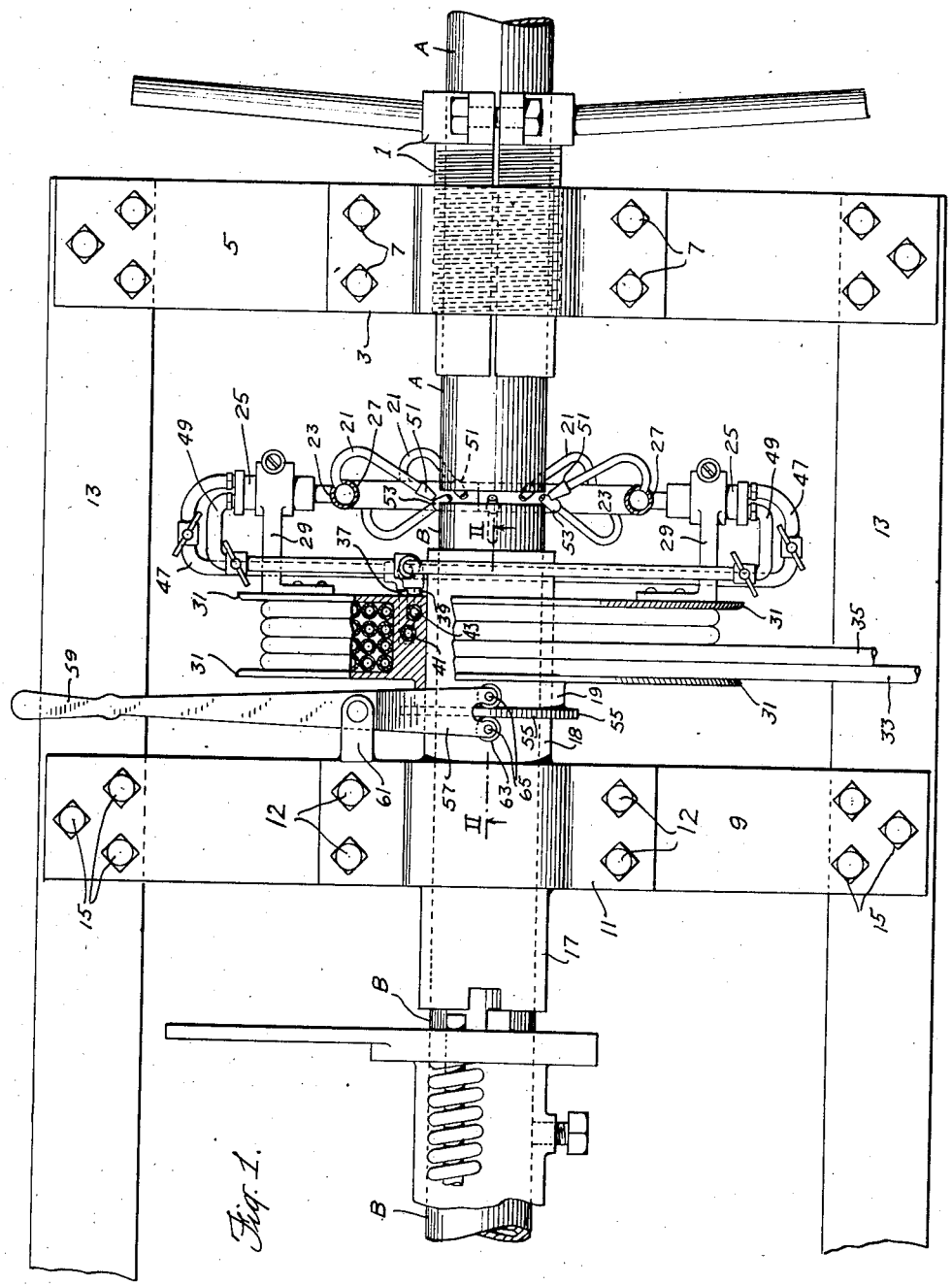

May 3, 1932. H. W. JONES 1,856,560
TORCH HEAD
Filed Nov. 20, 1930 2 Sheets-Sheet 1

INVENTOR:
Homer W. Jones,
BY
Byrnes Townsend & Potter,
ATTORNEYS.

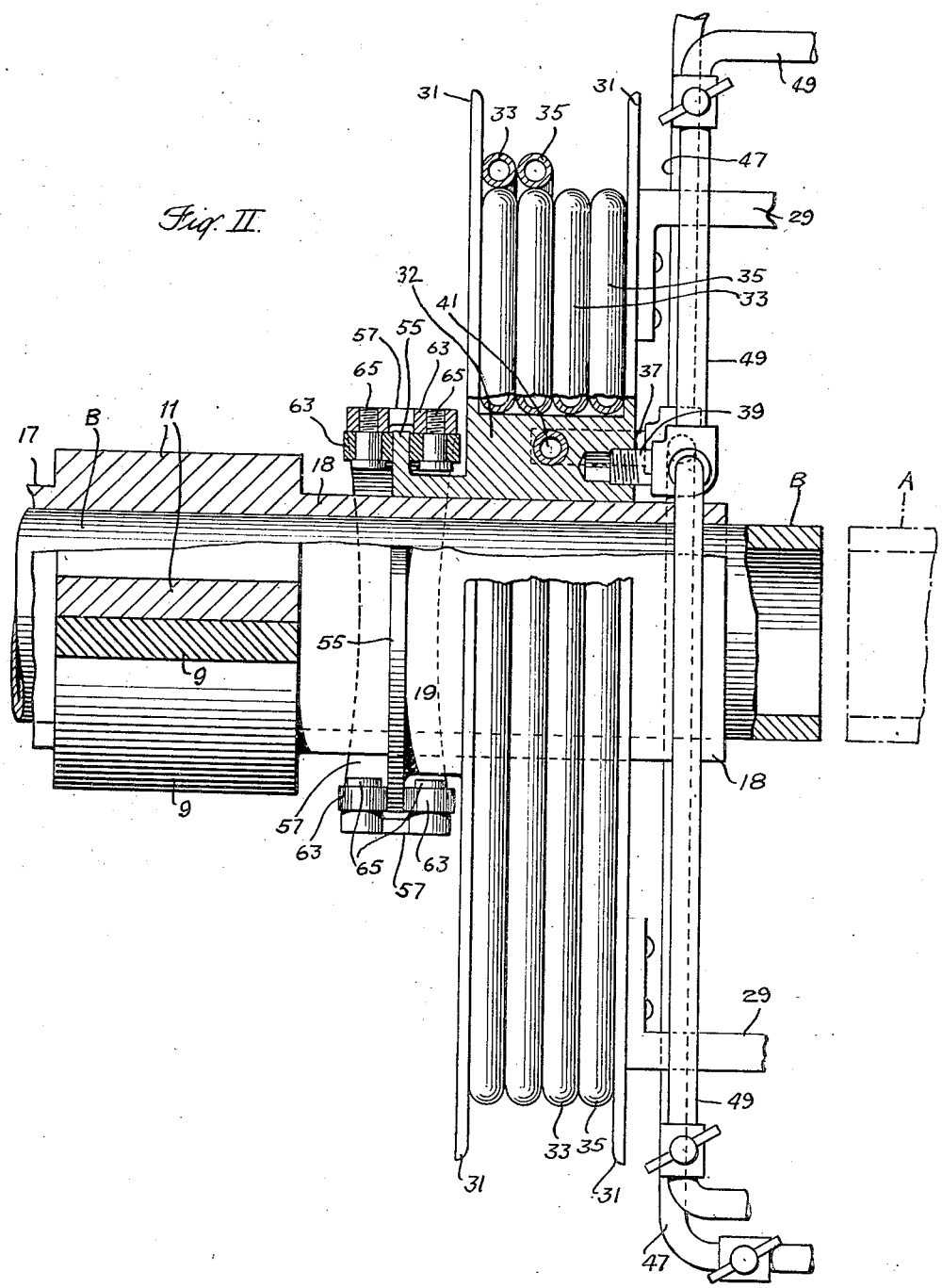

Patented May 3, 1932

1,856,560

UNITED STATES PATENT OFFICE

HOMER W. JONES, OF WILLIAMSVILLE, NEW YORK, ASSIGNOR TO THE LINDE AIR PRODUCTS COMPANY, A CORPORATION OF OHIO

TORCH HEAD

Application filed November 20, 1930. Serial No. 496,967.

My invention relates to machines for working metals with heat, and especially to devices for operating and regulating the heaters or torches, such as combustion torches and electric arcs which are used in the machines.

It is among the objects of my invention to provide a heating device which can be given any desired rotative or longitudinal movement about a pipe or other article upon which work is to be done while the heat is being applied.

Another object of my invention is to provide means within convenient control of one operator for accurately regulating longitudinal and rotative movements of torches as well as the degree of heat supplied by torches which are adapted to heat restricted areas of the articles worked upon.

Other objects of my invention will be apparent from the following description of a pipe welding machine which employs oxy-acetylene torches. The description refers to the drawings constituting a part hereof, in which Figure 1 is a top plan view of a portion of a butt-welding machine, and Figure 2 is a sectional view taken approximately along the line II—II of Fig. 1.

As shown in Figure 1, a relatively fixed pipe A is fixedly clamped in the machine by the clamp 1 which is threadably secured in the yoke 3. The yoke 3 is secured to the end transverse frame member 5 by the bolts 7. The frame has an intermediate transverse frame member 9 on which an intermediate yoke 11 is secured by the bolts 12.

Devices for guiding and clamping a relatively movable pipe B in endwise relationship to pipe A and for controlling various forward and backward movements of the pipe B to produce a welding of the ends of the pipes are mounted on and between the yoke 9, and an end yoke. The pipe controlling device, the extreme end yoke and the end transverse frame member are not shown. The frame of the machine is formed by bolting the transverse frame members to longitudinal frame members 13 by the bolts 15.

The intermediate yoke 9 carries cylindrical projecting collars 17 and 18 which are bored to align the pipe B with the pipe A and through which the pipe B is capable of sliding longitudinally. The collar 18 constitutes a hollow spindle for a bearing 19 which is mounted to rotate and to slide longitudinally on the external surface of the spindle and constitutes one member of a torch head.

The torch head comprises the oxy-acetylene torches 21, a torch ring 23 adapted to support the torches and conduct gases to the torches, one or more gas mixers 25 which communicate with the torch ring and with gas supply pipes, a reel for the gas supply pipes and the supporting bearing 19.

I prefer to use two gas mixers 25 and to use a torch ring comprising two semi-circular parts with conduits or bores 27 extending therethrough to the ends of each of the semi-circular parts, but the torch ring may consist of one or more parts and one or more mixers can be used. Various arrangements of the bore 27 in the torch ring can be used. There may be as many parts of the bore 27 as there are torches, there being at least as many mixers as there are bores.

The tips of the torches are desirably spaced from the end of spindle 18 and from the outer face of the hose reel drum by mounting the mixers 25 and the semicircular sections of the torch ring 23 on the brackets 29, but the torch ring 23 and the mixers 25 may be mounted directly on the outer face of the hose reel drum and the torches may be brought out of one side of the torch ring and lengthened in order to give the desired spacing between the hose reel drum and the tips of the torches.

The hose reel drum may consist of two circular spaced flanges 31 on an enlarged cylindrical portion 32 of the bearings 19. The flanges 31 form a space within which the gas supply hose 33 and the supply hose 35 for oxygen or air are reeled when the torches are revolved. The hoses 33 and 35 conduct gases from sources of supply to the nipples 37 and 39 which nipples are connected to the hoses at the outer ends of passages 41 and 43. The passages 41 and 43 are bored through the cylindrical portion 32 of the hose reel drum and they extend through the outer face of the drum. Oxygen and gas are conducted from the nipples 37 and 39 to each of the mixers 25 through pipes 47 and 49 which are connected to the mixers and the nipples by means of suitable connections. By attaching the torch ring and the mixers directly to the hose reel drum, the brackets 29 and the pipes 47 and 49 may be omitted.

According to one arrangement, the torches 21 are disposed so that alternate torches are directed obliquely onto the end face of the pipe A and the other torches are directed obliquely onto the confronting face of the pipe B but the torch tips can be directed in other directions. The torch tips 51 and 53 are desirably equally spaced on a circumference which is somewhat larger than the outer circumferences of the pipes to be welded so that longitudinal movements of the torches and the pipes do not interfere with each other. A space of about one-half inch between the tips and the outer walls of pipes A and B is usually sufficient but the space may be varied.

For welding pipes which are cut off on a plane substantially perpendicular to the axis of the pipes, obliquely disposed gas tips may be directed so that the angles between the flames are about 50° but the obliquity of the flames can be varied. The flames of each set of torches are preferably directed in opposite directions along the surface and toward the apex of the cone having its axis approximately coinciding with the axis of the pipes to be welded. In butt-welding pipes, it is desirable to regulate the spacing of the ends of the pipes and the angle between the flames so that the flames will impinge obliquely on the confronting faces of the pipes and reflect on opposing faces.

An adjusting lever 57 having an operating handle 59 on its outer end, is pivoted on the frame member 9 on bracket 61. The inner end of the lever 57 branches and the branches extend to approximately diametrically opposite points of the bearing 19. On the inner ends of the branches of lever 57, rollers 63 are mounted to turn on the shafts 65 and to bear on a circumferential flange, as for example the flange 55 near the inner end of the bearing 19. Since the rollers 63 travel on the opposite confronting faces of the flange 55, it is evident that longitudinal movement may be given to the torch head by locating the lever so that the rollers will operate on the opposing faces of the above described circumferential flanges. With this arrangement the torches may be given any desired angular movement around the pipes, the hose may be reeled on or off and the torch tips may be adjusted longitudinally of the pipes before or while the torch tips are revolved.

The invention has been described with reference to a welding machine which employs oxy-acetylene torches but it is to be understood that I do not intend to specifically limit my invention to the described machine since the invention may be embodied in machines which use other kinds of torches and it may be embodied in machines which are used for other purposes than welding. Various modifications have been pointed out but it is evident that other modifications can be made in the described welding head without departing from the invention, and I wish the invention to be limited only by the limitations imposed by the prior art and by the invention defined in the annexed claims.

I claim:—

1. A head for supporting and operating torches comprising a bearing member adapted for rotatable and longitudinal movement, a support for said bearing, a conduit-reel on the bearing member, means on the bearing member for supporting said torches, and means engaging the bearing member to longitudinally actuate the bearing in either direction while the bearing is rotated.

2. A head for supporting and operating torches comprising a support, a spindle on said support, a bearing member adapted for rotatable and longitudinal movement on said spindle, a plurality of circumferential flanges on the bearing member, and means pivoted on the support and engaging at least one of said flanges to actuate the bearing member longitudinally in either direction while the bearing member is rotated.

3. A head for supporting and operating torches comprising a bearing member adapted for rotatable and longitudinal movement on a fixed spindle, means on the bearing member to reel a supply conduit, a torch ring supported on said bearing member, and conducting means rotatable with said bearing and reel to provide communication between said conduit and said torch ring.

4. A head for supporting and operating torches comprising a hollow spindle adapted to receive an article to be worked upon by torches, a bearing member adapted for rotatable and longitudinal movement on said spindle, spaced flanges on the bearing member to provide a reeling drum for conduits, means to secure the conduits to the drum, a torch ring supported on the drum and a plurality of circumferentially disposed torch means mounted on said ring, and communicating conduits extending through the drum and then to the torch means.

5. A head for supporting and operating torches comprising a hollow spindle adapted to receive an article to be worked upon by torches, a bearing member adapted for rotatable and longitudinal movement on said spindle, spaced flanges on the bearing member to provide a reeling drum for conduits, means to secure the conduits to the drum, a torch ring supported on the drum and a plurality of torch means mounted on said ring and disposed on a circumference outside of the article to be worked upon, and communicating conduits extending through the drum and then to the torch means.

6. A torch head comprising a spindle, a bearing member adapted for rotatable and longitudinal movement on said spindle, a flanged drum on the bearing member having passages extending through the body of the drum and terminating in one face of the drum, a plurality of torch means having tips spaced from the drum and arranged circumferentially, means to mount the tips on the drum, and means to supply gases from sources of supply to the tips through said passages.

7. A torch head comprising a spindle, a bearing member adapted for rotatable and longitudinal movement on said spindle, a plurality of flanges on the bearing member, means engaging at least one of said flanges to actuate the bearing member longitudinally in either direction while said bearing member is rotated, a plurality of torch means having tips spaced from the flanges and arranged circumferentially, means to mount the torch means on a portion of the bearing member, said bearing member having bores extending through a portion thereof, flexible means capable of being reeled on the bearing means to conduct gases to said bores, and means to conduct gases from the bores to the torch means.

8. A torch head comprising a spindle, a bearing member adapted for rotatable and longitudinal movement on said spindle, a hose reel and torch means supported on the bearing, said torch means having tips which are spaced from the hose reel and arranged circumferentially, a circumferential guide flange on the bearing member, and a lever pivoted on the journalled support and having bearing means at one end to engage the guide flange and actuate the torches longitudinally while they are rotated.

9. A torch head comprising a support which is adapted to support an article which is to be worked upon by torches, a spindle on said support, a bearing member adapted for revolving and longitudinal movement on said spindle, torch means supported on the bearing member, said torch means having tips spaced on a circumference around the article which is to be worked, means to conduct gases to the torch means while the torches are rotated, flanged portions on the bearing member, and means to engage at least one of said flanges to actuate the torches longitudinally while they are rotated.

10. A welding torch head adapted to weld together the end edges of two pieces of pipe, said head comprising a hollow spindle adapted to receive the pipe to be welded; a bearing member rotatably mounted on said spindle; a ring of torches carried by said bearing member and surrounding the axis of said spindle, said torches having discharge passages therein adapted to direct welding flames in opposite lengthwise directions of the pipe upon the end edges of the pipe to be welded and obliquely to the plane of rotation of said torches.

11. A welding torch head adapted to weld together the end edges of two pieces of pipe, said head comprising a hollow spindle adapted to receive the pipe to be welded; a bearing member rotatably mounted on said spindle; a ring of torches carried by said bearing member and surrounding the axis of said spindle, said torches having gas discharge passages therein adapted to direct welding flames upon the end edges of the pipe to be welded; each alternate torch being adapted to direct a flame upon one pipe end and each of the other torches being adapted to direct a flame upon the other pipe end to be welded.

In testimony whereof, I affix my signature.

HOMER W. JONES.